United States Patent [19]
Browne

[11] Patent Number: 5,453,205
[45] Date of Patent: Sep. 26, 1995

[54] TREATMENT OF EMULSIONS

[75] Inventor: Geoffrey R. Browne, Boya, Australia

[73] Assignee: Modern Environmental Service Trust, Gidgegannup, Australia

[21] Appl. No.: 150,138

[22] PCT Filed: May 29, 1992

[86] PCT No.: PCT/AU92/00250

§ 371 Date: Mar. 29, 1994

§ 102(e) Date: Mar. 29, 1994

[87] PCT Pub. No.: WO92/21421

PCT Pub. Date: Dec. 10, 1992

[30] Foreign Application Priority Data

May 29, 1991 [AU] Australia .................................. PK6407

[51] Int. Cl.$^6$ ........................................ C02F 1/56
[52] U.S. Cl. ..................... 210/708; 210/710; 210/714; 210/725; 210/727; 210/909; 252/358
[58] Field of Search .................................. 210/708, 714, 210/713, 724, 725, 727, 728, 909, 710; 252/358

[56] References Cited

U.S. PATENT DOCUMENTS

| 3,446,731 | 5/1969 | Harsh | 210/708 |
|---|---|---|---|
| 4,013,555 | 3/1977 | Davis | 210/725 |
| 4,026,794 | 5/1977 | Mauceri | 210/708 |
| 4,179,369 | 12/1979 | Bradley et al. | 210/708 |
| 4,415,467 | 11/1983 | Piepho | 210/708 |
| 4,997,573 | 3/1991 | Browne | 210/725 |
| 5,133,870 | 7/1992 | Heidenreich | 210/708 |
| 5,200,086 | 4/1993 | Shah et al. | 210/708 |

*Primary Examiner*—Peter A. Hruskoci
*Attorney, Agent, or Firm*—Michael, Best & Friedrich

[57] ABSTRACT

A process for separating the components of an emulsion. The process comprises, adjusting the pH of the emulsion to 4 less, adding a coagulant to the emulsion, forming a substantially uniform dispersion of inert particulate carrier in the emulsion adding a polyelectrolyte flocculent either during or after the step of forming the substantially uniform dispersion of inert particulate carrier in the emulsion to form floccs of the inert particulate carrier, the dispersed liquid phase, and the contaminants, allowing the floccs to settle, and separating the relatively clarified continuous liquid phase from the settled floccs.

6 Claims, No Drawings

TREATMENT OF EMULSIONS

The present invention relates to the separation of the component of an emulsion.

the term "emulsion" is herein understood to mean a dispersion of a liquid phase in a continuous liquid phase, with either one or both of the liquid phases containing contaminants.

One specific example of a relatively complex emulsion is abattoir waste. Abattoir waste comprises a dispersion of a liquid phase of oils, fats and/or grease (hereinafter referred to as "the oil phase") in an aqueous phase, and further comprises contaminants:
(a) dissolved in the aqueous and/or oil phases;
(b) in particulate form suspended in the aqueous and/or oil phases; or
(c) in colloidal form in the aqueous and/or oil phases.

The contaminants include bacteria count, nutrients, BOD, sand, grit and faeces.

Abattoir waste does not satisfy the environmental requirements for disposal into river and stream systems and thus has to be treated to separate the oil phase from the aqueous phase and to remove the contaminants from the aqueous phase before disposal of the aqueous phase is possible. Generally, such treatment includes transferring the abattoir waste through a series of aerobic and anaerobic dams. This is not an altogether satisfactory treatment regime in view of the set-up and on-going costs involved. A further disadvantage is that the treatment is not adapted to recover economically valuable contaminants, such as dissolved protein, in the abattoir waste.

Another specific example of a relatively complex emulsion is mineral oil waste from de-greasing units widely used in industry. Typically, in such units suitable solvents are sprayed onto equipment to dissolve the oil/grease on the equipment, water is then sprayed onto the equipment to remove the dissolved oil/grease and remaining solvent, and the resultant emulsion, which by this stage includes grit and other contaminants, is collected in a sump and pumped to a settling pond.

Mineral oil waste does not satisfy the environmental requirements for disposal into river and stream systems and thus has to be treated to separate the oil/grease phase from the aqueous phase and to remove the solid and liquid contaminants from the aqueous phase before disposal of the aqueous phase is possible. At present there is no altogether satisfactory cost-effective treatment regime for this purpose.

An object of the present invention is to provide a process for separating the components of an emulsion.

A more particular object of the present invention is to provide a process for separating the components of complex emulsions comprising an oil-based liquid phase dispersed in a continuous aqueous phase, such as abattoir waste, mineral oil waste, dairy waste and food waste, to allow the aqueous phase to be released into river and stream systems.

According to the present invention there is provided a process for separating the components of an emulsion, as described herein, comprising the following steps in sequence:
(a) adjusting the pH of the emulsion to be 4 or less;
(b) adding a coagulant to the emulsion;
(c) forming a substantially uniform dispersion of inert particulate carrier in the emulsion;
(d) adding a polyelectrolyte flocculent either during or after the step of forming the substantially uniform dispersion of inert particulate carrier in the emulsion to form floccs of the inert particulate carrier, the dispersed liquid phase, and the contaminants;
(e) allowing the floccs to settle; and
(f) separating the relatively clarified continuous liquid phase from the settled floccs.

The basis of the present invention is that it has been found unexpectedly that adjustment of the pH of an emulsion, such as abattoir waste, to 4 or less and the addition of a coagulant has the effect of conditioning the emulsion so that inert particulate carrier and flocculent can separate the dispersed liquid phase and the contaminants, including dissolved contaminants, from the continuous liquid phase of the emulsion. The unexpected finding is derived from the combined effect of acid and coagulant being greater than the separate effect of acid and coagulant.

The term "inert" as used herein in relation to "particulate carrier" is understood to mean that the particulate carrier is not substantially attacked by the emulsion. In other words, the term "inert" means that the particulate carrier exhibits both suitable chemical and physical stability in the emulsion.

It is preferred that the flocculent is a polyelectrolyte flocculent. The term "polyelectrolyte flocculent" as used herein is understood to mean any suitable cationic, non-ionic and anionic flocculent.

It is preferred that the pH is adjusted to be 3.5 or less.

It is preferred that the pH is adjusted to be 3 or less.

It is preferred that the process further comprises adjusting the pH of the emulsion to be 5 or more after the addition of the coagulant in step (b) above.

It is particularly preferred that the pH is adjusted to be 5.5 or more after the addition of the coagulent in step (b) above.

It is preferred that the process further comprises processing the floccs to separate the inert particulate carrier from the dispersed liquid phase and the contaminants. It is particularly preferred that the process further comprises classifying the contaminants into valuable components.

It is preferred that the emulsion comprises a dispersion of an oil-based liquid phase in a continuous aqueous phase.

It is particularly preferred that the emulsion comprises abattoir waste, mineral oil waste, dairy waste, or food waste.

It is preferred that the coagulant comprises aluminium salts, ferrous salts or ferric salts.

It is preferred that the inert particulate carrier is selected from the group comprising sand, alumina, garnet, magnetite, hematite, ilmenite and calcite.

The process of the present invention is described further with reference to the following examples.

EXAMPLE 1

A series of samples of emulsified mineral oil waste from a de-greaser unit were treated in accordance with a preferred embodiment of the process of the present invention. The principal objective of the experimental work was to assess the extent to which the process of the present invention could separate the aqueous component from the mineral oil waste.

The mineral oil waste samples contained a dispersion of oil and grease in a continuous aqueous phase and the contaminants at the levels set out in Table 1 below.

TABLE 1

| | mg/l |
|---|---|
| Total Suspended Solids | 350 |
| Benzene | <1 |
| Toluene | <1 |
| Xylene | <1 |
| Polynuclear Aromatic Hydrocarbons | 230 |
| Chemical Oxygen Demand | 2570 |
| Biological Oxygen Demand | 110 |

The samples of the mineral oil waste were treated as follows.
1. Adjustment of the pH to between 2.5 and 3.5.
2. Addition of a coagulant-sodium aluminate.
3. Adjustment of pH to between 5.5 and 7.5.
4. Agitating the mineral oil waste and inert particulate carrier to form a uniform dispersion of inert particulate carrier in the mineral oil waste.
5. Addition of a polyelectrolyte flocculent (Zetag 92—produced by Allied Colloids) to form floccs of oil/grease, contaminants listed in Table 1, inert particulate carrier, and polyelectrolyte flocculent.
6. Separation of the floccs and the liquor.

The samples of the liquor recovered from step 6 above were tested and found to be water with no visible oil/grease and with contaminants at the levels set out in Table 2 below.

TABLE 2

| | mg/l |
|---|---|
| Total Suspended Solids | 7 |
| Benzene | <1 |
| Toluene | <1 |
| Xylene | <1 |
| Polynuclear Aromatic Hydrocarbons | <0.1 |
| Chemical Oxygen Demand | 550 |
| Biological Oxygen Demand | 90 |

The results of the experimental work indicate clearly that the preferred embodiment of the process of the present invention is capable of separating the aqueous phase of the mineral oil waste from the oil/grease phase and substantially removing the contaminants from the aqueous phase.

EXAMPLE 2

A series of samples of abattoir waste were treated in accordance with a preferred embodiment of the process of the present invention. The principal purpose of the experimental work was to assess the extent to which the process of the present invention could separate the aqueous component from the abattoir waste.

The abattoir waste samples contained a dispersion of 85 mg/l of oil and grease in a continuous aqueous phase and the contaminants at the levels set out in Table 3 below.

TABLE 3

| | mg/l |
|---|---|
| Total Suspended Solids | 2,700 |
| Total Phosphorus | 30.5 |
| Chemical Oxygen Demand | 29.9 |
| Biological Oxygen Demand | 1850 |
| Total Kjeldahl Nitrogen | 175 |

The samples of abattoir waste were treated as follows:
1. Adjustment of pH to between 2.5 and 3.5.
2. Addition of a coagulant—sodium aluminate.
3. Adjustment of pH to between 5.5 and 7.5.
4. Agitating the abattoir waste and inert particulate carrier to form a uniform dispersion of inert particulate carrier.
5. Addition of polyelectrolyte flocculent (Zetag 92—produced by Allied Colloids) to form floccs of oil and grease, contaminants listed in Table 3, inert particulate carrier, and polyelectrolyte flocculent.
6. Separation of the floccs and the liquor.

The samples of the liquor recovered from step 6 above were tested and found to have only 5 mg/l oil and grease and the contaminants at levels set out in Table 4 below.

TABLE 4

| | mg/l |
|---|---|
| Total Suspended Solids | 45 |
| Total Phosphorus | 0.85 |
| Chemical Oxygen Demand | *ND |
| Biological Oxygen Demand | 220 |
| Total Kjeldahl Nitrogen | 30 |

*ND — not determined

The results of the experimental work indicate clearly that the preferred embodiment of the process of the present invention is capable of substantially separating the aqueous phase of the abattoir waste from the oil/grease phase and substantially removing the contaminants from the aqueous phase to a level at which the aqueous phase is safe for disposal in river and stream systems.

Many modifications may be made to the process of the present invention as described above without departing from the spirit and scope of the present invention.

In this regard, it is noted that the step of adjusting the pH to between 5.5 and 7.5 after the initial acidification and coagulant addition steps is not an essential step of the process of the invention and was necessary as part of the procedure in the examples in order to ensure total removal of the aluminium based coagulant and optimum performance of the particular polyelectrolyte used in the examples.

I claim:

1. A process for treating an emulsion comprising a dispersed oil-based liquid phase in a continuous aqueous liquid phase, either of the dispersed liquid phase and the continuous liquid phase containing contaminants, the process comprising the steps of:

(a) adjusting the pH of the emulsion to be 3.5 or less;

(b) adding a coagulant selected form the group consisting of aluminum salts, ferrous salts and ferric salts to the emulsion;

(c) adjusting the pH of the emulsion to be 5 or more after the addition of the coagulant in step (b) and forming a substantially uniform dispersion of inert particulate carrier selected from the group consisting of sand, alumina, garnet, magnetite, hematite, ilmenite and calcite in the emulsion;

(d) adding a polyelectrolyte flocculent either during or before the step of forming the substantially uniform dispersion of inert particulate carrier in the emulsion to form floccs of the inert particulate carrier, the dispersed liquid phase, and the contaminants;

(e) allowing the floccs to settle; and (f) separating the relatively clarified continuous liquid phase from the settled floccs.

2. The process defined in claim 1, comprising adjusting the pH to be 3 or less.

3. The process defined in claim 1, comprising adjusting the pH of the emulsion to be 5.5 or more after the addition of the coagulant in step (b) above.

4. The process defined in claim 1, further comprising processing the floccs to separate the inert particulate carrier from the dispersed liquid phase and the contaminants.

5. The process defined in claim 1, further comprising classifying the contaminants in the settled floccs.

6. The process defined in claim 1, wherein the emulsion comprises abattoir waste, mineral oil waste, dairy waste, or food waste.

* * * * *

UNITED STATES PATENT AND TRADEMARK OFFICE
CERTIFICATE OF CORRECTION

PATENT NO.  : 5,453,205
DATED       : Sep. 26, 1995
INVENTOR(S) : Geoffrey R. Browne It is certified that error appears in the above-identified patent and that said Letters Patent is hereby corrected as shown below:

On the cover page, delete the following:
    Assignee:   Modern Environmental Service Trust,
                  Gidgegannup, Australia On the cover page, ADD the following:
    Assignee:   Dawn Annette Hoefer, trustee of
                  Modern Environmental Service Trust,
                  Gidgegannup, Australia Signed and Sealed this Twenty-sixth Day of March, 1996

*Attest:*

BRUCE LEHMAN

*Attesting Officer*    *Commissioner of Patents and Trademarks*